US012609717B2

(12) United States Patent
Mudulodu et al.

(10) Patent No.: US 12,609,717 B2
(45) Date of Patent: Apr. 21, 2026

(54) FILTERING CARRIER FREQUENCY OFFSET ESTIMATIONS FOR A DEVICE PAIR COMBINATION

(71) Applicant: Silicon Laboratories Inc., Austin, TX (US)

(72) Inventors: Sriram Mudulodu, Hyderabad (IN); Manoj Kumar Medam, Hyderabad (IN); Rambabu Katla, Hyderabad (IN)

(73) Assignee: Silicon Laboratories Inc., Austin, TX (US)

( * ) Notice: Subject to any disclaimer, the term of this patent is extended or adjusted under 35 U.S.C. 154(b) by 348 days.

(21) Appl. No.: 18/322,639

(22) Filed: May 24, 2023

(65) Prior Publication Data

US 2024/0333316 A1 Oct. 3, 2024

Related U.S. Application Data

(60) Provisional application No. 63/492,691, filed on Mar. 28, 2023.

(51) Int. Cl.
H04B 1/00 (2006.01)
H04B 1/12 (2006.01)
(52) U.S. Cl.
CPC .............. H04B 1/0028 (2013.01); H04B 1/12 (2013.01)
(58) Field of Classification Search
CPC ................................ H04B 1/0028; H04B 1/12
See application file for complete search history.

(56) References Cited

U.S. PATENT DOCUMENTS

| | | | |
|---|---|---|---|
| 8,437,415 B2 | 5/2013 | Mudulodu et al. | |
| 8,644,426 B1 | 2/2014 | Zhou et al. | |
| 10,827,451 B2 | 11/2020 | Mudulodu | |
| 11,082,270 B1 * | 8/2021 | Wu ........................... | H04L 1/20 |
| 11,632,733 B2 | 4/2023 | Mudulodu et al. | |
| 2004/0190560 A1 * | 9/2004 | Maltsev .............. | H04L 27/2675 |
| | | | 370/503 |
| 2007/0155341 A1 | 7/2007 | Haiut | |
| 2008/0101520 A1 * | 5/2008 | Huang ................ | H04L 27/2613 |
| | | | 375/371 |
| 2011/0149724 A1 * | 6/2011 | Lee ..................... | H04L 27/2688 |
| | | | 370/216 |
| 2017/0230145 A1 * | 8/2017 | Gore ................. | H04W 52/0238 |
| 2019/0028316 A1 * | 1/2019 | Chu ........................ | H04L 7/042 |
| 2021/0075557 A1 | 3/2021 | Mudulodu et al. | |

* cited by examiner

*Primary Examiner* — Junpeng Chen
(74) *Attorney, Agent, or Firm* — Trop, Pruner & Hu, P.C.

(57) ABSTRACT

A receiver includes: an analog front end (AFE) circuit to receive and process an incoming radio frequency (RF) signal comprising a packet; an analog-to-digital converter (ADC) to receive and digitize the processed incoming RF signal into a digital signal; a packet detector to detect the packet; an estimation circuit to determine a carrier frequency offset (CFO) estimate based at least in part on a preamble of the packet; an averager to determine a CFO average value for a plurality of packets communicated between a device pair combination of the receiver and a transmitter; and a compensation circuit to compensate for CFO between the device pair combination based at least in part on the CFO average value.

19 Claims, 6 Drawing Sheets

FILTERING CARRIER FREQUENCY OFFSET ESTIMATIONS FOR A DEVICE PAIR COMBINATION

CROSS-REFERENCE TO RELATED APPLICATION

This application claims the benefit of U.S. Provisional Application No. 63/492,691, filed on Mar. 28, 2023, and entitled "FILTERING CARRIER FREQUENCY OFFSET ESTIMATIONS FOR A DEVICE COMBINATION."

BACKGROUND

In a Wireless Local Area Network (WLAN) communication system, devices including an Access Point (AP) and a Station such as an Internet of Things (IoT) device or a smartphone communicate with each other. In a WLAN system, a device pair combination of a Station and an Access Point (AP) is an example of two devices that communicate with each other.

An AP can communicate or be associated with multiple stations; but a station is typically associated with only one AP at a given point in time. In operation, a station processes packets received from its associated AP and discards packets from other stations or other APs. One task in furthering acceptable communication between these devices is determining an improved estimate and compensating for a Carrier Frequency Offset (CFO). Current techniques can have undesired complexity and increased gate counts.

SUMMARY OF INVENTION

In one aspect, a receiver includes: an analog front end (AFE) circuit to receive and process an incoming radio frequency (RF) signal comprising a packet; an analog-to-digital converter (ADC) coupled to the AFE circuit to receive and digitize the processed incoming RF signal into a digital signal; a packet detector coupled to the ADC to detect the packet; an estimation circuit coupled to the packet detector, the estimation circuit to determine a carrier frequency offset (CFO) estimate based at least in part on a preamble of the packet; an averager coupled to the estimation circuit, wherein the averager is to determine a CFO average value for a plurality of packets communicated between a device pair combination of the receiver and a transmitter; and a compensation circuit coupled to the estimation circuit, where the compensation circuit is to compensate for CFO between the device pair combination based at least in part on the CFO average value.

In an implementation, the averager is to determine the CFO average value based on a plurality of CFO estimates, each of the plurality of CFO estimates for one of the plurality of packets communicated between the device pair combination. The receiver may further include a memory to store at least some of the plurality of CFO estimates. The receiver also may include an accumulator coupled to the estimation circuit, the accumulator to calculate a sum of the plurality of CFO estimates for the device pair combination. The receiver also may include a divider coupled to the accumulator, where the divider is to generate the CFO average value based on the sum and an averaging factor. The averaging factor may be programmable based at least in part on a signal quality metric associated with the device pair combination. The divider may use an incrementing averaging factor until a predetermined number of the plurality of CFO estimates are stored in the memory.

In an implementation, the accumulator is to remove a value of a first CFO estimate from the sum and add a value of a new CFO estimate to the sum. The estimation circuit may determine the CFO value based on a plurality of training fields and signal fields. When the CFO estimate departs from the CFO average value by at least a threshold value (e.g., when a cyclic redundancy checksum does not pass), the averager may not use the CFO estimate to determine the CFO average value. When a temperature difference between determination of a first CFO estimate and a second CFO estimate exceeds a threshold, the averager may not use the second CFO estimate to determine the CFO average value. The averager may not use a CFO estimate determined for a second packet, when the second packet is from a different device pair combination.

In an implementation, the receiver is included in an access point, the access point to maintain a CFO average value for each of a plurality of devices in communication with the access point.

In another aspect, a method includes: receiving, in a RF front end circuit of a receiver, an RF signal comprising a packet; estimating, in an estimation circuit of the receiver, a CFO of the packet; determining that the packet is from a first source; averaging the CFO estimate with a plurality of CFO estimates for a plurality of other packets from the first source; and compensating for a CFO on a second packet between the receiver and the first source using the average value of the CFO estimate.

In an implementation, the method further comprises, in response to determining that the packet is not from the first source, not compensating for the CFO using the average CFO value, and compensating for the CFO using the CFO estimate. In response to determining that the packet is not from the first source, the CFO estimate is not averaged with the plurality of CFO estimates. The method further may include storing the CFO estimate in a memory and providing the CFO estimate to an accumulator and a divider to determine the average value of the CFO estimate based at least in part on a sum of the plurality of CFO estimates and an averaging factor.

In yet another aspect, a system includes: a crystal oscillator to generate a clock signal at an oscillation frequency; and a receiver coupled to the crystal oscillator, the receiver comprising: an AFE circuit to receive and process an incoming RF signal comprising a packet; a digitizer coupled to the AFE circuit to convert the processed incoming RF signal into a digital signal; an estimation circuit coupled to the digitizer, the estimation circuit to determine a CFO estimate of a CFO between the system and a second system based at least in part on a preamble of the packet; an averager coupled to the estimation circuit, wherein the averager is to determine a CFO average value for a plurality of packets communicated between the system and the second system; and a compensation circuit coupled to the estimation circuit, where the compensation circuit is to compensate for CFO between the system and the second system device pair combination using the CFO average value.

In an implementation, the system further comprises: a memory to store a plurality of CFO estimates of the CFO between the system and the second system; an accumulator coupled to the memory, wherein the accumulator is to calculate a sum of the plurality of CFO estimates; and a divider coupled to the accumulator, wherein the divider is to generate the CFO average value based on the sum and an averaging factor. The system may further include a circuit to introduce, based at least in part on the CFO average value, a CFO compensation value into a second packet to be transmitted to the second system.

DETAILED DESCRIPTION

Figure 1:
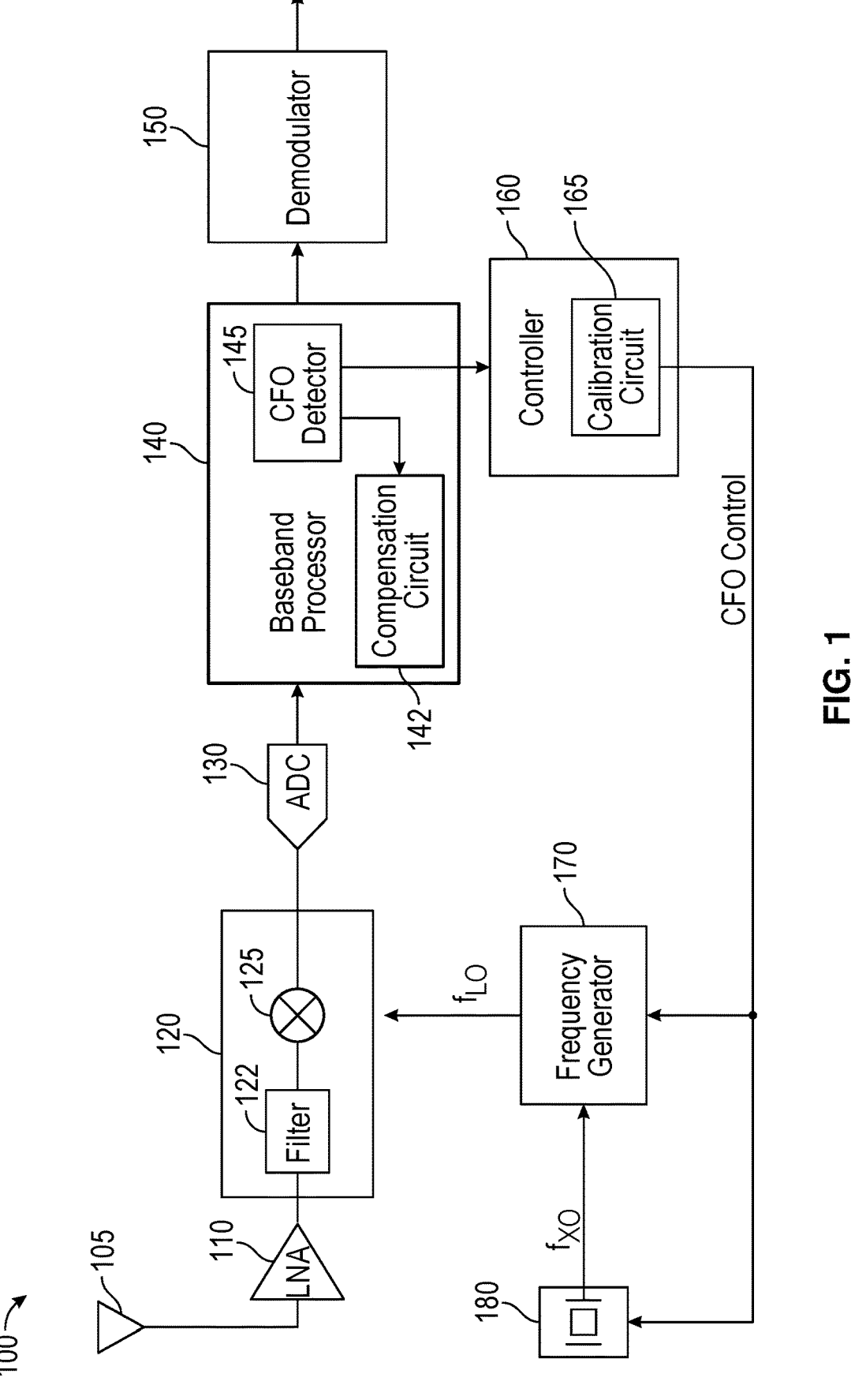
FIG. 1 is a block diagram of a receiver in accordance with an embodiment.

In various embodiments, techniques are disclosed to improve performance of a receiver in a Wireless Local Area Network (WLAN) communication system, with minimal gate count overhead. Embodiments can be applied to any communication system where there are two unique devices that communicate with each other.

With two devices in communication, there is typically a Carrier Frequency Offset (CFO) between the carrier frequency at which the devices operate, e.g., due to variations in oscillators present in the devices. Typically, an estimate of CFO is determined regardless of the source of an incoming packet and compensated on the respective/same packet. Using previous CFO estimates to improve the performance at a device can lead to inconsistencies when attempting to compensate for this CFO, which can vary depending on the different devices that may be in communication.

WLAN packets have a transmit address (originating device address (e.g., in the form of a Media Access Control/Basic Service Set ID (MAC/BSSID)) and a receive address (destination device address (MAC/BSSID)) at the start of a payload, so that the receiver device determines if the packet is destined for it and to decide to continue further decoding.

On packet detection, the station starts decoding the packet and estimates at least one CFO value. Then based on decoded data, the position of the BSSID of the transmitter, within the packet is known. Based on the BSSID, it is determined if the current packet being decoded originated from the associated AP or not. Note that the BSSID location in packets/physical layer protocol data units (PPDUs) is different for aggregated or non-aggregated packets. When aggregated, the BSSID location in the decoded bitstream is determined to identify the BSSID. Also note that IEEE 802.11g packets are always not aggregated and IEEE 802.11ax packets are always aggregated. In case of IEEE 802.11n packets, aggregation is determined based one of the bits present in the signal fields.

In embodiments, a filtering process is performed to determine and maintain an average CFO estimate value for a given device pair combination, to more accurately account for CFO. To this end, an expected BSSID is programmed with the station or is known by the station during the association process. To this end, this identifier of an associated device for a device pair combination may be stored in a register or other storage. In a case of a multiple BSSID (MBSSID), an AP is identified with multiple BSSIDs, and thus a receiver can store in one or more such registers or other storage all the BSSIDs that an AP can have and BSSID match is determined based on all these BSSIDs.

Once it is determined that the decoded BSSID matches with the intended BSSID, then a CFO estimate for the current packet is used to determine and/or update an average CFO estimate value for the device pair combination. Details of this operation are described further below.

As mentioned above, in various embodiments CFO estimation may be performed in a filtered manner, in which CFO estimates are maintained on a per device pair combination basis. That is, CFO estimates can be maintained and averaged for a particular combination of device pairs, e.g., an AP and a station in communication with that AP.

Referring now to FIG. 1, shown is a block diagram of a receiver in accordance with an embodiment. As shown in FIG. 1, receiver 100 may be implemented, in some cases, as a single semiconductor die receiver as included within an integrated circuit (IC). In such embodiments, all circuitry shown in FIG. 1 with the exception of an external antenna 105 and an external oscillator 180 (e.g., a crystal oscillator) may be implemented on the single semiconductor die.

In the embodiment shown, incoming radio frequency (RF) signals are received via antenna 105 and provided to a signal processing path including a low noise amplifier (LNA) 110. After appropriate amplification here, the incoming RF signals are provided to an analog front end (AFE) circuit 120. In various implementations, AFE circuit 120 may include various filtering, gain circuitry and so forth, including an analog filter 122. In certain instances the bandwidth of this filter may be dynamically controlled in the presence of significant CFO. Further as shown, AFE circuit 120 includes a mixer 125 configured to downconvert an RF signal to a lower frequency signal, e.g., an intermediate frequency (IF) signal such as a low-IF signal, zero IF signal, or other lower frequency signal.

To this end, mixer 125, which in some cases may be a complex mixer, is configured to downconvert the incoming RF signals using a mixing signal having a mixing frequency, shown as mixing signal (fLo) received from a frequency generator 170. As one example, frequency generator 170 may be a local oscillator (LO) that may be implemented as a phase locked loop (PLL). Frequency generator 170 may generate the mixing signal using an incoming oscillator signal, fxo, received from external oscillator 180.

Still referring to the signal processing path of receiver 100, the downconverted signals output from AFE circuit 120 are provided to a digitizer, shown in FIG. 1 as an analog-to-digital converter (ADC) 130, which digitizes the signals. In turn, these digitized signals, which may be at baseband, are provided to a baseband processor 140. Although shown as a standalone baseband processor in the FIG. 1 embodiment, baseband processor 140 in some cases may be implemented within a digital signal processor (DSP).

After various baseband processing, including filtering, digital mixing, decimation and so forth, resulting baseband-processed signals may be provided to a demodulator 150 that demodulates these signals. In different implementations, one of a variety of demodulation schemes may be used. For purposes of discussion herein, assume that demodulator 150 is configured to perform orthogonal frequency division multiplexing (OFDM) demodulation. The resulting demodulated signals may be output from demodulator 150 and provided to further downstream processing circuitry, such as an audio processor (not shown for ease of illustration in FIG. 1).

To compensate for variations in oscillator frequency and to compensate for offset between this oscillator frequency and an oscillator frequency of a communicating device, baseband processor 140 may include a CFO detector 145. Although shown as being included within baseband processor 140, in other implementations CFO detector 145 may be a separate component. As will be described further herein, CFO detector 145 may be configured to detect, at baseband, CFO in received signals. Although shown at a high level in FIG. 1, understand that CFO detector 145 is configured to perform CFO filtering and/or averaging as described herein, to realize more accurate CFO estimates.

Based at least in part on this detected CFO, a compensation circuit 142, also shown as being included in baseband processor 140, may compensate for the detected CFO in the current packet being processed (and following packets).

In an embodiment, CFO detector 145 also may communicate any detected CFO to a controller 160. Although controller 160 is shown as a separate component in FIG. 1, it is possible in some implementations for this controller to be included within a baseband processor (or as part of a DSP in some implementations). In any event, controller 160 may include either dedicated or programmable hardware circuitry configured to control compensation of CFO, among other functions. To this end, controller 160 may include or be coupled to a non-volatile storage or other non-transitory storage medium to store instructions and data usable for performing CFO detection and compensation as described herein.

As further detailed in FIG. 1, controller 160 includes a calibration circuit 165. In an embodiment, calibration circuit 165 may be configured to calibrate for CFO. Thus in response to CFO information received from CFO detector 145, calibration circuit 165 may determine one or more control values for use in controlling CFO. Calibration circuit 165 may communicate such CFO control information to one or more of frequency generator 170 and/or oscillator 180. In an embodiment, based on this information, dynamic real time CFO compensation may occur.

Furthermore, understand while in the embodiment of FIG. 1, only a receiver signal processing path is shown for ease of illustration, such receiver may be part of a wireless transceiver further including transmit capabilities. In such cases, carrier frequency offset compensation further may be performed for the transmit path, e.g., by way of appropriate control of a frequency generator (either frequency generator 170 or another such frequency generator) that provides a mixing signal used for upconverting transmission signals to an appropriate RF frequency. In a embodiment, the frequency offset compensation is done at the baseband processor using a numerically controlled oscillator (NCO). Understand that while shown at this high level in the embodiment of FIG. 1, many variations and alternatives are possible.

Figure 2:
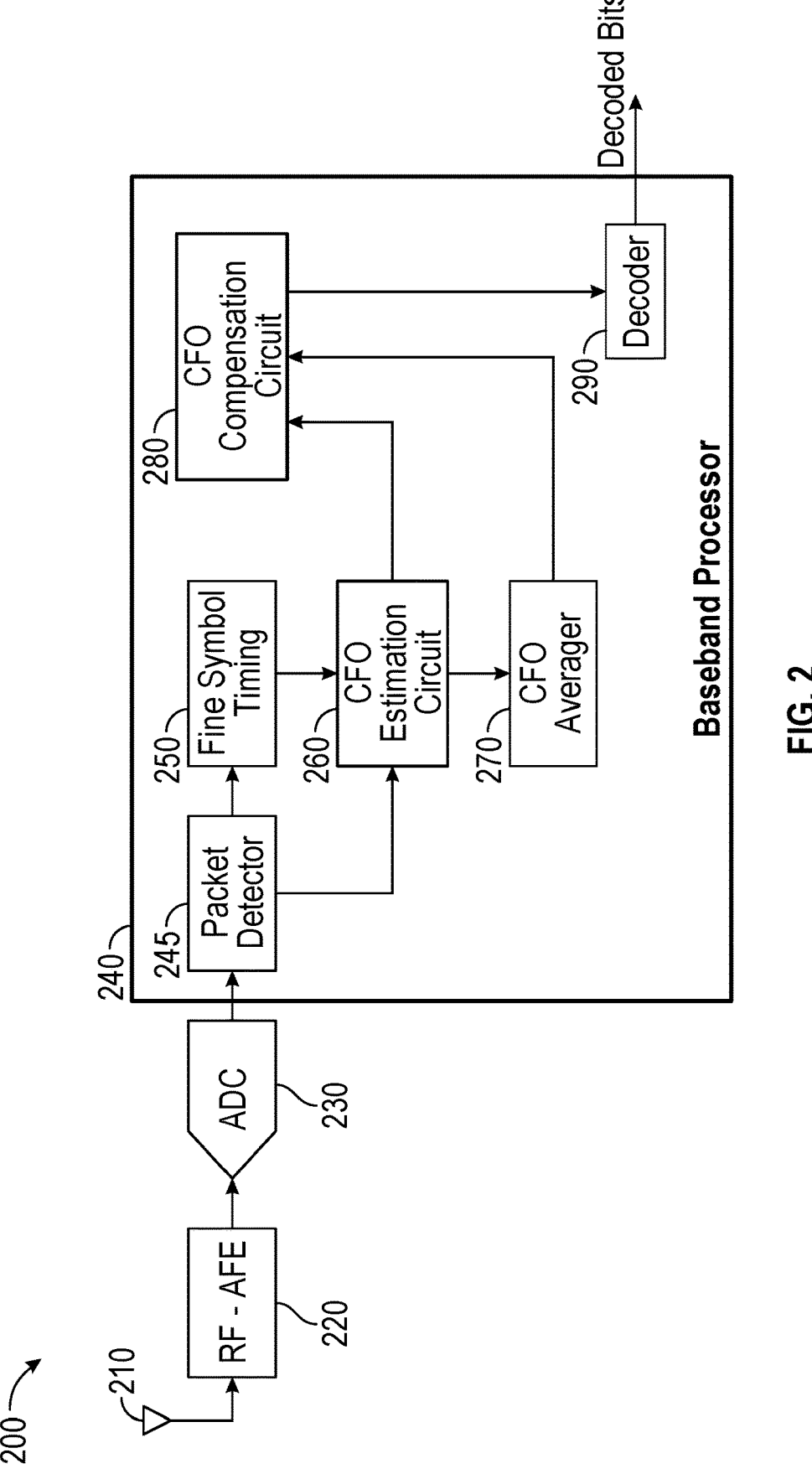
FIG. 2 is a block diagram of a receiver in accordance with an embodiment.

Referring now to FIG. 2, shown is a block diagram of a receiver in accordance with an embodiment. As shown in FIG. 2, receiver 200 is a wireless receiver that may generally be configured similarly to receiver 100 of FIG. 1. However, further details are shown with respect to the CFO processing described herein. As illustrated, receiver 200 receives incoming RF signals via an antenna 210, which passes the signals to an RF analog front end (AFE) circuit 220. AFE circuit 220 may perform various RF processing, including amplification, e.g., in a low noise amplifier (LNA), filtering and downconversion to a lower frequency, e.g., an intermediate frequency (IF), zero IF, or baseband level. The resulting lower frequency signals are digitized in an ADC 230.

Still with reference to FIG. 2, the digitized stream is then provided to a baseband processor 240. As illustrated, baseband processor 240 includes a packet detector 245, which may be configured to detect receipt of a packet. In an embodiment, packet detector 245 may detect presence of a packet based on receipt of an expected pattern, in at least part of a preamble of the packet. As shown, detected packets are provided both to a fine symbol timing circuit 250 and a CFO estimation circuit 260. Fine symbol timing circuit 250 may determine an OFDM symbol boundary based at least in part on detecting various preamble fields, e.g., using a correlator. In one embodiment, the fine symbol timing is determined based on a legacy long training field (L-LTF) by computing/comparing the windowed energy and delayed correlation.

CFO estimation circuit 260 is configured to estimate CFO present in a given packet. To this end, CFO estimation circuit 260 may estimate CFO based on repetitive patterns present, e.g., in various fields of a packet preamble (or other packet fields). More specifically, phase offsets between different instances of the repeated pattern may be identified and used to estimate the CFO.

This CFO estimate along with the packets themselves are provided to a CFO compensation circuit 280 which may perform CFO compensation. Although embodiments are not limited in this regard, the CFO compensation may be applied directly to the packets, e.g., by performing an exponential multiplication on complex values of the samples of the packet and the values generated from the NCO. In addition or alternately, other CFO compensation techniques such as updating operating frequency of one or more oscillators also may be performed, such that the CFO observed on the next packets for the device pair combination is low (interpacket).

In accordance with various embodiments, CFO estimation may be more accurately determined for pairs of devices in communication, rather than determining CFO estimates based on all incoming packets regardless of source. To this end, CFO estimations may be performed selectively and independently for a given pair of devices. In an embodiment, a specific CFO estimate (and more particularly an average CFO estimate) can be determined for a given receiver (e.g., an IoT device) and a given transmitter (e.g., an AP) device pair combination. In an embodiment, this determination may be performed by first identifying the packet source. In an embodiment, incoming packets are determined to be received from a selected source, e.g., based on a source identifier present in the packet (e.g., a BSSID).

When it is determined that the packet is from a selected source, the CFO estimate determined in CFO estimation circuit 260 triggers processing within a CFO averager 270. While described more fully below, at a high level CFO averager 270 operates to filter CFO estimates for the selected source and to average over a window of CFO estimates with respect to this source. In turn, a resulting CFO average value is sent to CFO compensation circuit 280, which may perform compensation using this CFO average value, when available. After performing CFO compensation, the compensated packet is provided to additional circuitry 290 (shown in FIG. 2 as a decoder) of baseband processor 240 for further processing, including demodulation and decoding. Although shown at this high level in the embodiment of FIG. 2, many variations and alternatives are possible.

In WLAN-orthogonal frequency division multiplexing (OFDM) systems, frequency offset estimation is done using legacy short training and long training fields (L-STF and L-LTF). As such, estimation circuit 260 may determine a CFO estimate using L-STF (a coarse CFO) and a CFO estimate using L-LTF (a fine CFO). In an embodiment, the fine CFO estimate is done on digital IQ values where coarse CFO is compensated. Thus the final CFO is equal to the sum of coarse and fine CFO values.

In an embodiment where the receive packet is in accordance with the IEEE 802.11ax specification, the CFO estimation is also done using legacy signal, repeated legacy signal (L-SIG, RL-SIG) fields (and optionally high efficiency (HE-STF)). In another embodiment where the receive packet is in accordance with the IEEE 802.11n specification, the CFO estimation is done using a high throughput short training field (HT-STF); for an IEEE 802.ac frame, a very high throughput short training field (VHT-STF) is used.

In embodiments, intra-frame averaging can be done on frames/PPDU types, where the CFO can be estimated from multiple fields of a packet. In the case of 802.11ax communications, intra-frame averaging is done using the CFO estimate obtained from the following fields: fine CFO and CFO estimate from L-SIG, RL-SIG are averaged; fine CFO and CFO estimate from HE-STF are averaged; CFO estimate from L-SIG, RL-SIG and CFO estimate from HE-STF are averaged; and fine CFO, CFO estimate from L-SIG, RL-SIG and CFO estimate from HE-STF are averaged.

Thus there can be a number of manners to estimate CFO, any of which can be used in obtaining samples for the averaging described herein. In one embodiment, the CFO value written into the memory is the fine CFO. In another embodiment, the CFO value written into the memory is the CFO obtained for 802.11b packets. In yet another embodiment, the CFO value written into the memory is the CFO value based on coarse CFO, fine CFO, and CFO obtained using L-SIG and RL-SIG fields. For another embodiment, the CFO value written into the memory is the CFO value based on coarse CFO, fine CFO and CFO obtained using at least HT-STF, VHT-STF, HE-STF fields of a packet. In a further embodiment, the CFO value written into the memory is the intra-frame averaged CFO value.

In addition to filtering based on device pair combination, additional checks may optionally be performed for robustness and improved performance, where these checks are referred to as "gated averaging." In an embodiment, a CFO value is considered for averaging only if the BSSID matches and L-SIG decoding is successful. In another embodiment, a CFO value is considered for averaging only if the BSSID matches, L-SIG decoding is successful and a cyclic redundancy checksum (CRC) pass is observed on the decoded payload. An aggregated packet will have an MPDU CRC where the CRC status is obtained from multiple packets (or MPDUs) and based on the multiple CRC status bits, it is determined to consider the CFO for averaging. In another embodiment, a CFO value is considered for averaging only if a temperature change between the current and previous PPDU is less than a threshold value. Like CFO, the temperature is also considered for each packet. The temperature may be obtained from a register or sensor. As one example, assume a temperature threshold is set to 20 degrees, a first packet is received at a temperature of 25 degrees and a second packet is received at a temperature of 80 degrees. With this scenario, the difference in the first and second packet temperatures is 55 degrees, which is greater than the threshold of 20 degrees, and thus the CFO estimate from second packet is not considered for averaging. In another embodiment, if the temperature difference between the packets is high, a reset trigger is provided such that previous CFO captured values are erased and the latest CFO values start to be stored, as described in later section. The average CFO value is also reset in this case. Optionally this reset trigger is provided only when the temperature measured on the latest successive packets (packets after the temperature difference observation) is stable.

In a still further embodiment, a CFO value is considered for averaging only if the current measured CFO value is within a threshold distance of the current average CFO value. If the current measured CFO value exceeds this threshold distance, then there is a significant probability that the current measured CFO value could be stale. In this case, the stale CFO value measurement is not considered for averaging. In a further embodiment, a CFO value is considered for averaging only if the current packet arrives within a predetermined time duration and a temperature difference is within the threshold.

Note that various combinations of these gated averaging criteria may be implemented in other embodiments. These advanced filtering options above ensure the reliability of CFO estimates to be used for averaging and thus increase the reliability of the determined CFO average value.

Figure 3:
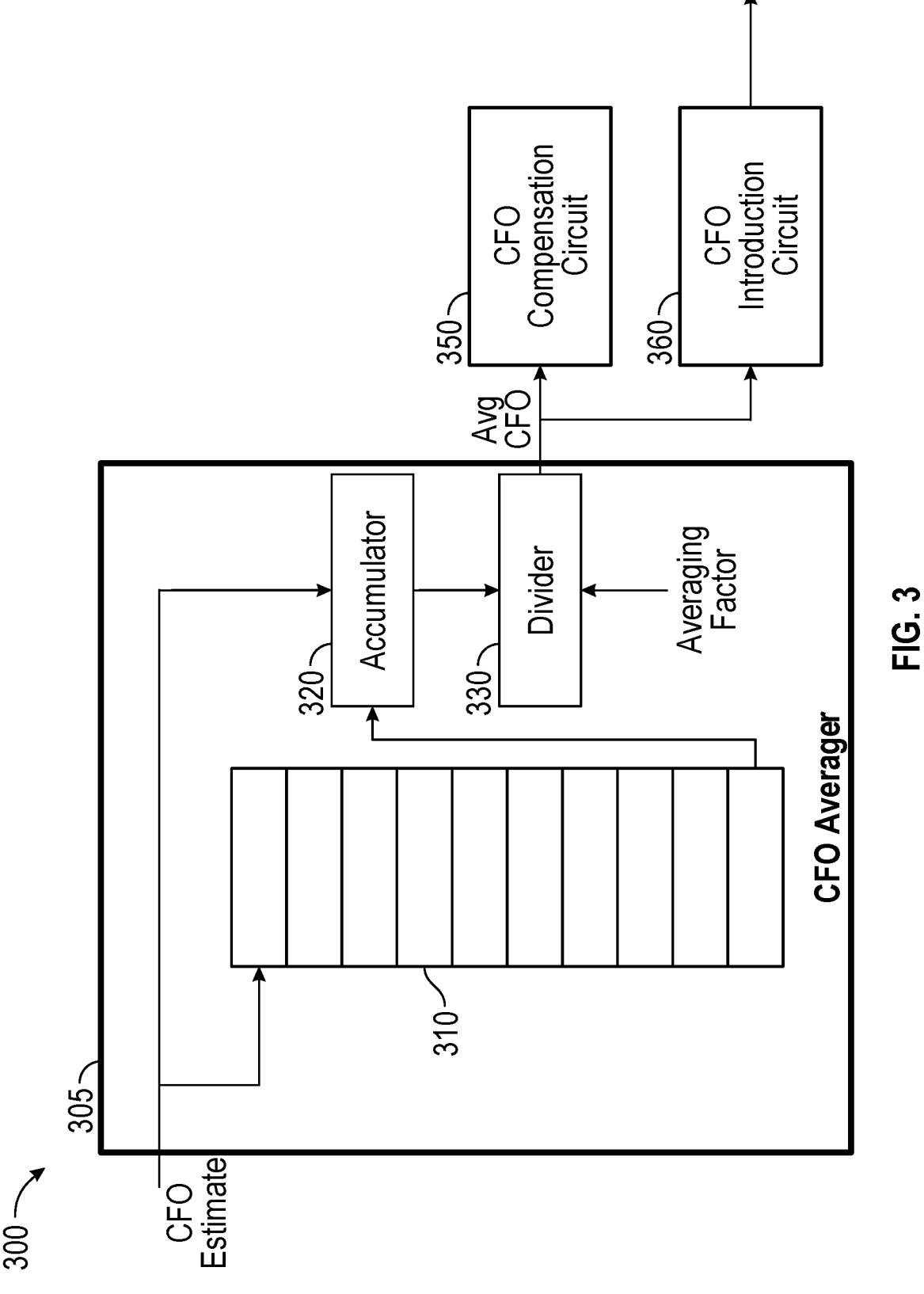
FIG. 3 is a block diagram of receiver circuitry including a CFO averager in accordance with an embodiment.

Referring now to FIG. 3, shown is a block diagram of receiver circuitry including a CFO averager in accordance with an embodiment. In FIG. 3, a CFO processing block of the receiver 300 is shown at a level of detail including CFO averager 305, which is a representation of an averager such as CFO averager circuit 270 of FIG. 2, that may be present in a receiver signal processing path. As illustrated, incoming CFO estimates are provided both to a memory 310 and an accumulator 320. In various embodiments, memory 310 may be implemented as random access memory (RAM) and may include a number of entries to store a series of CFO estimates for a particular source. Note that in cases where the receiver is part of an AP or other device that may maintain separate CFO estimations for different device pairs, there may be multiple sections of memory 310 with each section associated with each such device pair.

In operation a CFO estimate is written to memory 310 (which acts as a circular buffer) when the corresponding packet is for the device pair combination of interest, otherwise it is not. The process is repeated for each packet detected by the station. Once memory 310 is filled, it starts writing to the first location, overwriting the previous values. Note that it is possible to have a reset operation, which clears the entire list of CFO values in memory 310. This reset operation can be performed when the station becomes associated with a different AP, and/or to overcome from any hypothetical state of the system to clear and start again.

In embodiments, accumulator 320 is configured to calculate a sum of CFO estimates over a given window, and provide the sum to a divider 330. Accumulator 320 is implemented as a windowed accumulation. For each new CFO value, accumulator 320 performs one addition and one subtraction. The values to be subtracted is accessed from a given location within memory 310 based on an averaging factor. If the averaging factor is 10, then memory 310 accesses the value that is 10 addresses away from the current write pointer for the subtraction.

Divider 330 is configured to divide the accumulated value by the averaging factor to determine a CFO average value. In an embodiment, the averaging factor may be a fixed number (e.g., obtained from firmware), or may be a dynamically tunable value. In an embodiment, if the circular buffer of memory 310 is not filled to do the averaging as specified by the averaging factor, then the averaging factor is set to the number of CFO measurements available, until the number of measurements reach the programmed averaging factor.

In an embodiment, the averaging factor is based on a signal-to-noise (SNR) of the packets from its associated device. If the SNR is low, the averaging factor is set to a higher value and vice-versa. For example, if the SNR of the packets is in the range of 10 to 20 dB, then the averaging factor used is 64. If the SNR of the packets is in the range of 50 to 60 dB, then the averaging factor used is 8.

In another embodiment, the averaging factor may be based on a received signal strength (e.g., a received signal strength indicator (RSSI)) of the received packet. If the RSSI of the received packet is greater than a threshold, then the averaging factor may be set to a given value (e.g., 1), indicating that the estimated value is good enough and no further averaging is needed. Similarly, the averaging factor can be determined as a function of the range of the RSSI values observed on the decoded packets. For example, if the RSSI values are in the range of −20 to −30 dBm and −50 to −60 dBm, then the averaging factors are 16 and 32 respectively.

As further illustrated in FIG. 3, the CFO average value is provided to a CFO compensation circuit 350 which performs CFO compensation for the receiver. In addition, this average value also may be provided to a CFO introduction circuit 360 which may introduce CFO into a signal to be transmitted for a transmitter associated with the receiver (e.g., a transmitter of a station or AP). While shown at this high level in the embodiment of FIG. 3, many variations and alternatives are possible. For example, it may be possible to perform packet filtering, storing, accumulation, and averaging of CFO values further in combination with firmware and/or software.

With embodiments, a station can improve receiver performance by filtering packets originating from its associated AP, storing, accumulating, averaging CFO values, and applying the average CFO value for the CFO compensation. The average CFO value obtained using this process is termed as inter-frame averaged CFO value. In embodiments, the AP can perform the same process of filtering, storing, accumulating, averaging the CFO values, but exclusively/ separately done for each station associated with it.

Figure 4:
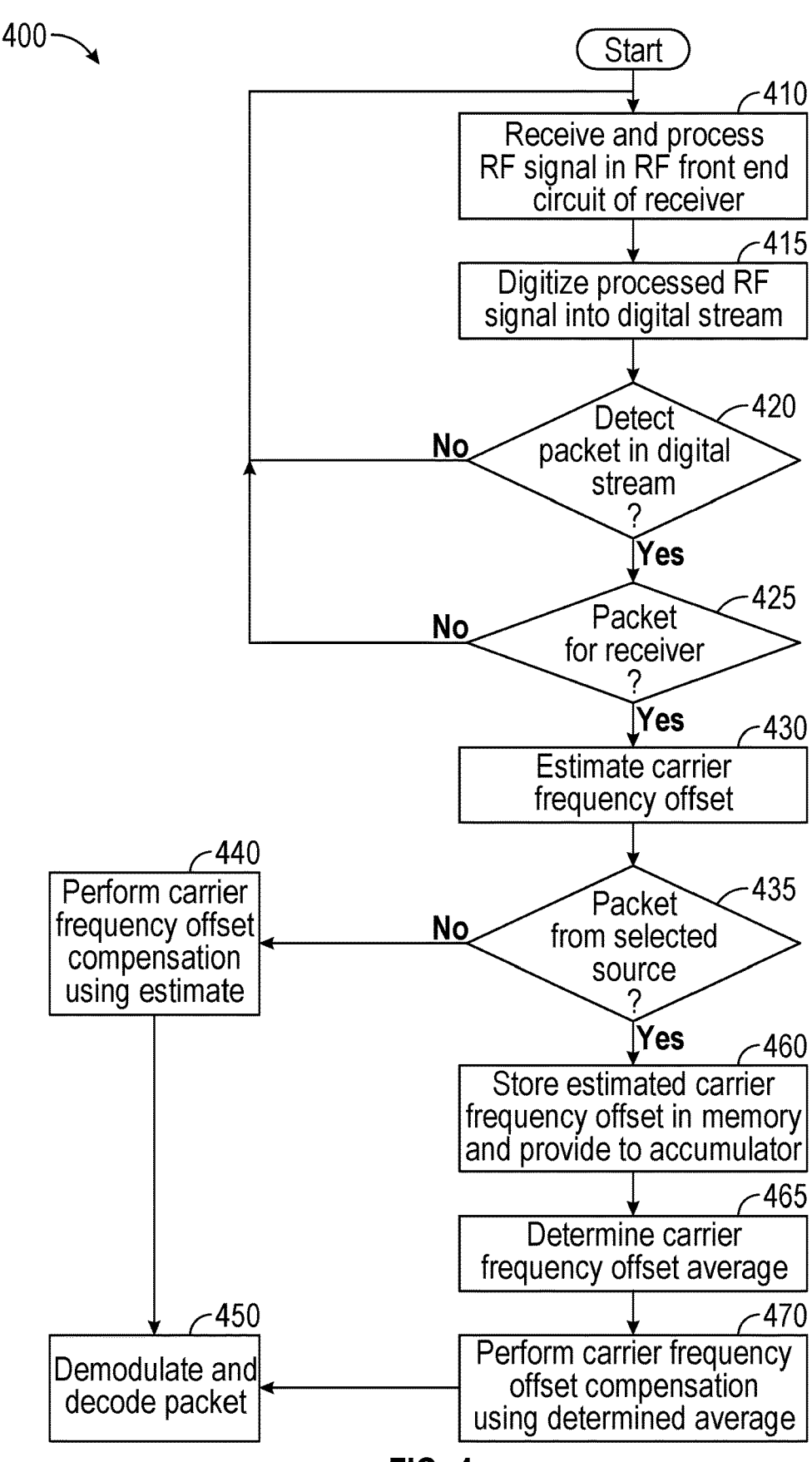
FIG. 4 is a flow diagram of a method in accordance with an embodiment.

Referring now to FIG. 4, shown is a flow diagram of a method in accordance with an embodiment. More specifically, method 400 is a method for performing filtered averaging CFO estimations for a particular device pair combination. As such, method 400 may be performed by hardware circuitry including a CFO estimation circuit and associated averager alone and/or in combination with firmware and/or software, which may be implemented as instructions stored in a non-transitory storage medium.

As illustrated, method 400 begins by receiving and processing an RF signal in a front end circuit of a receiver (block 410). This processing may include various signal processing and downconversion to a lower frequency signal. Next, at block 415, the processed RF signals are digitized into a digital stream.

Based on processing of this digital stream, it is determined whether a packet is detected (diamond 420), which may be performed by a packet detector of the receiver. If not, control passes back to block 410 for further RF signal processing.

Instead if it is determined that a packet is detected, it is next determined whether the packet is directed to the receiver (diamond 425). This determination may be based on a destination address of the packet. If the packet is not destined for the receiver, no further action occurs and control passes back to block 410.

When it is determined that the packet is intended for the receiver, control passes to block 430 where a CFO value for the packet may be estimated, e.g., in a CFO estimation circuit. Then, it is determined at diamond 435 whether the packet is from a selected source, namely a source of a particular device pair combination. This determination may be based on a source address present in the packet. If the packet is not from the selected source, control passes to block 440, where CFO compensation may be performed using the CFO estimate. After such compensation, at block 450 the packet may be demodulated and decoded. In an embodiment, the packets are not further processed if the source address does not match the selected source.

Still with reference to FIG. 4, when it is determined at diamond 435 that the packet is from the selected source, control passes to block 460, where the estimated CFO value is stored in a memory and also is provided to an accumulator, e.g., of the averager. Thereafter at block 465, a CFO average value is determined in the averager. Control next passes to block 470, where CFO compensation is performed using this determined average value and thereafter the packet is demodulated and decoded (block 450). Although shown at this high level in the embodiment of FIG. 4, many variations and alternatives are possible.

Figure 5:
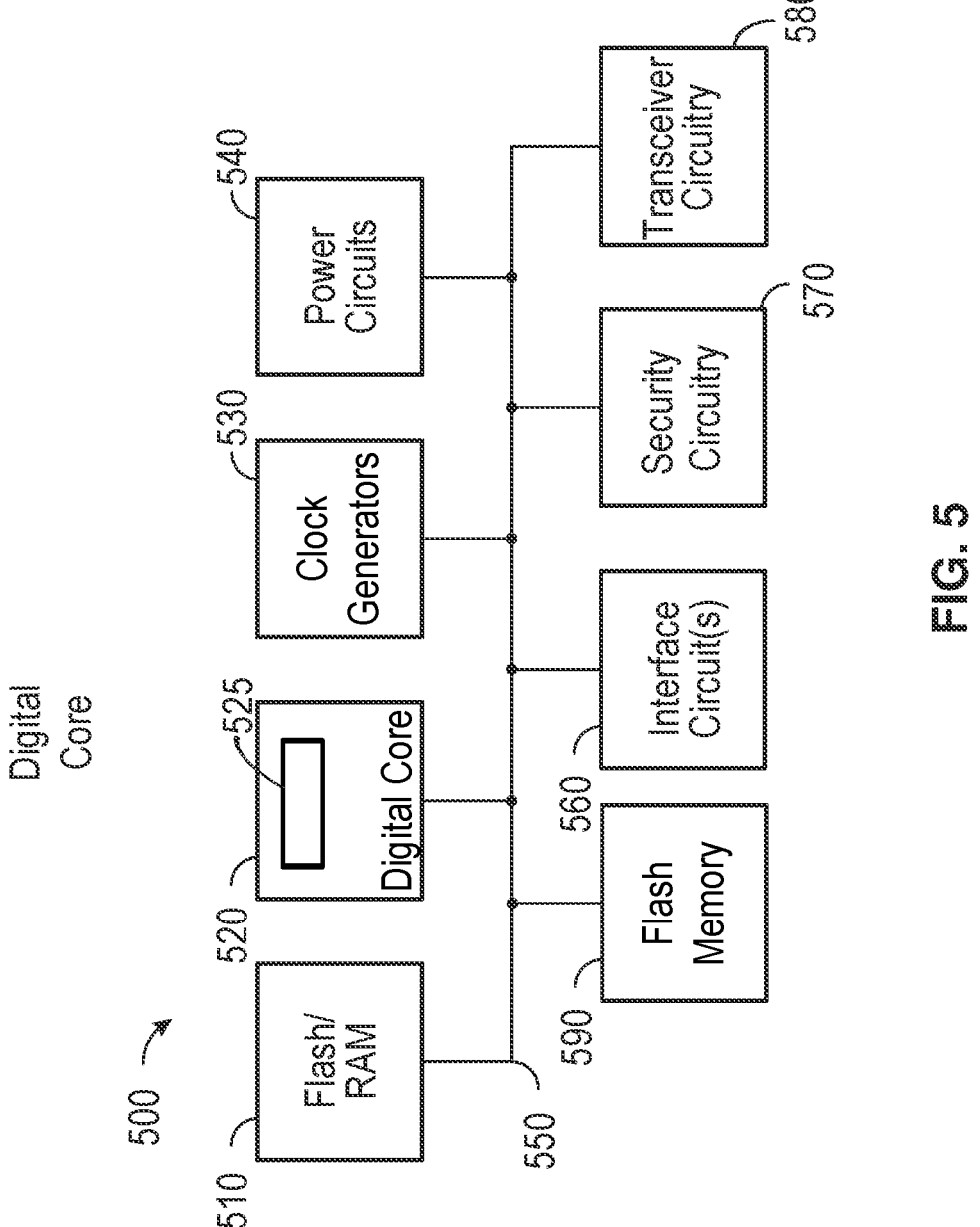
FIG. 5 is a block diagram of a representative integrated circuit that includes CFO compensation circuitry in accordance with an embodiment.

Referring now to FIG. 5, shown is a block diagram of a representative integrated circuit 500 that includes CFO compensation circuitry as described herein. In the embodiment shown in FIG. 5, integrated circuit 500 may be, e.g., a dual mode wireless transceiver that may operate according to one or more wireless protocols (e.g., WLAN and Bluetooth, among others) or other device that can be used in a variety of use cases. In one or more embodiments, the circuitry of integrated circuit 500 shown in FIG. 5 may be implemented on a single semiconductor die.

Integrated circuit 500 may be included in a range of devices including a variety of stations, including smartphones, wearables, smart home devices, other consumer devices, or industrial, scientific, and medical (ISM) devices, among others.

In the embodiment shown, integrated circuit 500 includes a memory system 510 which in an embodiment may include volatile storage, such as RAM and non-volatile memory as a flash memory. As further shown integrated circuit 500 also may include a separate flash memory 590 (or other non-volatile memory), optionally. Flash memory 590 may be implemented as a non-transitory storage medium that can store instructions and data. Such non-volatile memory may store instructions, including instructions for performing CFO compensation as described herein.

Memory system 510 couples via a bus 550 to a digital core 520, which may include one or more cores and/or microcontrollers that act as a main processing unit of the integrated circuit. In turn, digital core 520 may couple to clock generators 530 which may provide one or more phase locked loops or other clock generator circuitry to generate various clocks for use by circuitry of the IC. As further shown, digital core 520 includes a CFO control circuit 525, which may determine CFO on a device pair combination as described herein and use a resulting CFO average value in compensating for the determined CFO.

As further illustrated, IC 500 further includes power circuitry 540, which may include one or more voltage regulators. Additional circuitry may optionally be present depending on particular implementation to provide various functionality and interaction with external devices. Such circuitry may include interface circuitry 560 which may provide a LAN or other interface with various off-chip devices, and security circuitry 570 which may perform wireless security techniques.

In addition as shown in FIG. 5, transceiver circuitry 580 may be provided to enable transmission and receipt of wireless signals, e.g., according to one or more of a local area or wide area wireless communication scheme, such as Zigbee, Bluetooth, IEEE 802.11, IEEE 802.15.4, cellular communication or so forth. Understand while shown with this high level view, many variations and alternatives are possible.

Figure 6:
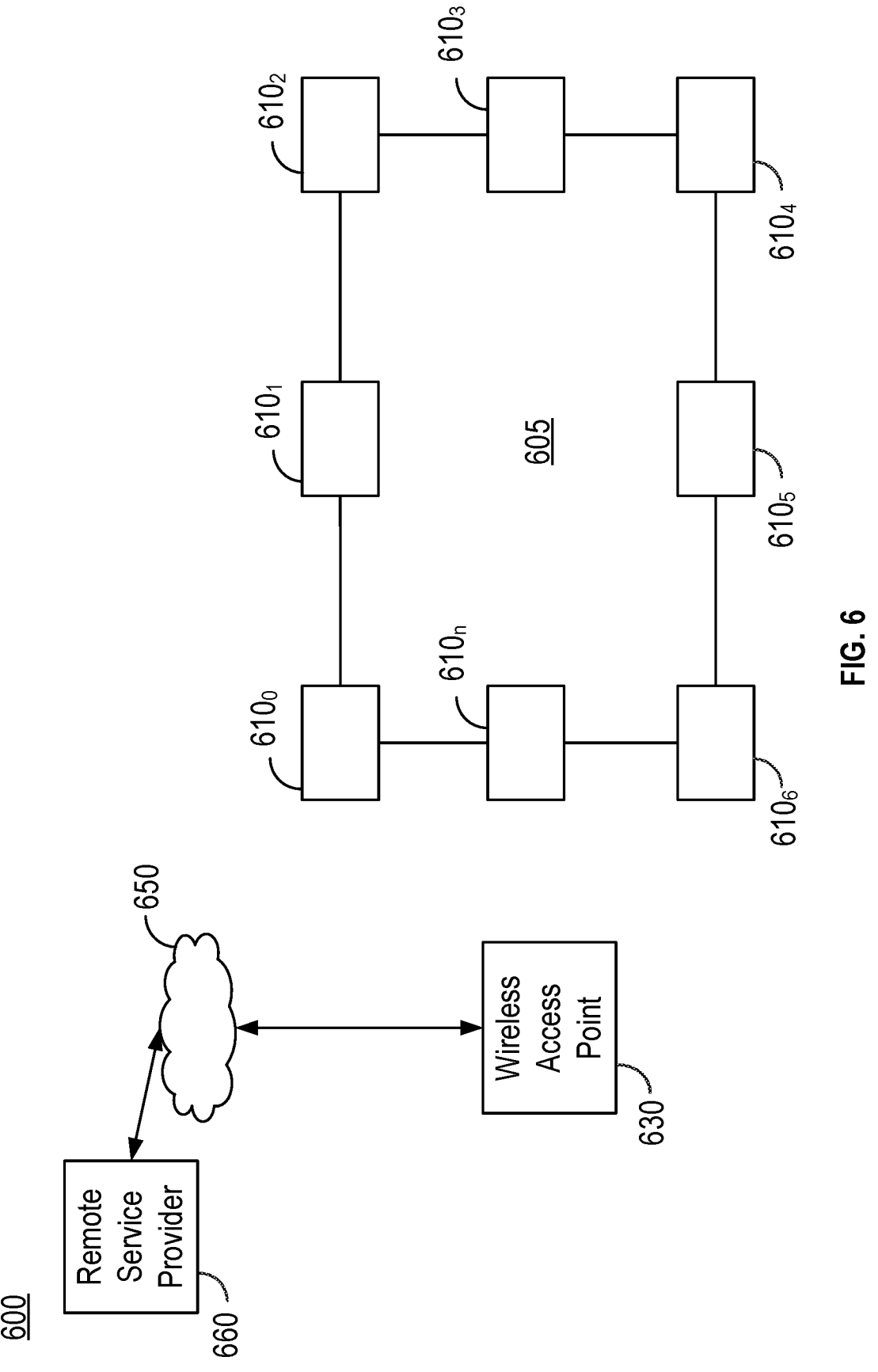
FIG. 6 is a high level diagram of a network in accordance with an embodiment.

ICs such as described herein may be implemented in a variety of different devices such as wireless stations, IoT devices or so forth. Referring now to FIG. 6, shown is a high level diagram of a network in accordance with an embodiment. As shown in FIG. 6, a network 600 includes a variety of devices, including wireless stations including smart devices such as IoT devices, access points and remote service providers, which may leverage embodiments to improve reliability of communication between devices and access points.

In the embodiment of FIG. 6, a wireless network 605 is present, e.g., in a building having multiple wireless devices 6100-*n*. As shown, wireless devices 610 couple to an access point 630 that in turn communicates with a remote service provider 660 via a wide area network 650, e.g., the internet. Wireless devices 610 may compensate for CFO using CFO average values determined as described herein. Understand while shown at this high level in the embodiment of FIG. 6, many variations and alternatives are possible.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A receiver comprising:
an analog front end (AFE) circuit to receive and process an incoming radio frequency (RF) signal comprising a packet;
an analog-to-digital converter (ADC) coupled to the AFE circuit to receive and digitize the processed incoming RF signal into a digital signal;
a packet detector coupled to the ADC to detect the packet;
an estimation circuit coupled to the packet detector, the estimation circuit to determine a carrier frequency offset (CFO) estimate based at least in part on a preamble of the packet;
an averager coupled to the estimation circuit, wherein the averager is to determine a CFO average value for a plurality of packets communicated between a device pair combination of the receiver and a transmitter; and
a compensation circuit coupled to the estimation circuit, wherein the compensation circuit is to compensate for CFO between the device pair combination based at least in part on the CFO average value; and
wherein when a temperature difference between determination of a first CFO estimate and a second CFO estimate exceeds a threshold, the averager is to not use the second CFO estimate to determine the CFO average value.

2. The receiver of claim 1, wherein the averager is to determine the CFO average value based on a plurality of CFO estimates, each of the plurality of CFO estimates for one of the plurality of packets communicated between the device pair combination.

3. The receiver of claim 2, further comprising a memory to store at least some of the plurality of CFO estimates.

4. The receiver of claim 3, further comprising an accumulator coupled to the estimation circuit, wherein the accumulator is to calculate a sum of the plurality of CFO estimates for the device pair combination.

5. The receiver of claim 4, further comprising a divider coupled to the accumulator, wherein the divider is to generate the CFO average value based on the sum and an averaging factor.

6. The receiver of claim 5, wherein the averaging factor is programmable based at least in part on a signal quality metric associated with the device pair combination.

7. The receiver of claim 5, wherein the divider is to use an incrementing averaging factor until a predetermined number of the plurality of CFO estimates are stored in the memory.

8. The receiver of claim 4, wherein the accumulator is to remove a value of a first CFO estimate from the sum and add a value of a new CFO estimate to the sum.

9. The receiver of claim 1, wherein when a cyclic redundancy checksum of the packet does not pass, the averager is to not use the CFO estimate to determine the CFO average value.

10. The receiver of claim 1, wherein the averager is to not use a CFO estimate determined for a second packet, when the second packet is from a different device pair combination.

11. The receiver of claim 1, wherein the receiver is included in an access point, the access point to maintain a CFO average value for each of a plurality of devices in communication with the access point.

12. A method comprising:
receiving, in a radio frequency (RF) front end circuit of a receiver, an RF signal comprising a packet;
estimating, in an estimation circuit of the receiver, a carrier frequency offset (CFO) of the packet;
determining that the packet is from a first source;
averaging the CFO estimate with a plurality of CFO estimates for a plurality of other packets from the first source, unless a cyclic redundancy checksum of the packet does not pass; and
compensating for a CFO on a second packet between the receiver and the first source using the average value of the CFO estimate.

13. The method of claim 12, further comprising, in response to determining that the packet is not from the first source, not compensating for the CFO using the average CFO value, and compensating for the CFO using the CFO estimate.

14. The method of claim 13, further comprising, in response to determining that the packet is not from the first source, not averaging the CFO estimate with the plurality of CFO estimates.

15. The method of claim 12, further comprising not averaging the CFO estimate with the plurality of CFO estimates for the plurality of other packets from the first source when a temperature difference between determination of a first CFO estimate and a second CFO estimate exceeds a threshold.

16. A system comprising:
a crystal oscillator to generate a clock signal at an oscillation frequency; and
a receiver coupled to the crystal oscillator, the receiver comprising:
an analog front end (AFE) circuit to receive and process an incoming radio frequency (RF) signal comprising a packet;
a digitizer coupled to the AFE circuit to convert the processed incoming RF signal into a digital signal;
an estimation circuit coupled to the digitizer, the estimation circuit to determine a carrier frequency offset (CFO) estimate of a CFO between the system and a second system based at least in part on a preamble of the packet;

an averager coupled to the estimation circuit, wherein the averager is to determine a CFO average value for a plurality of packets communicated between the system and the second system, wherein when a temperature difference between determination of a first CFO estimate and a second CFO estimate exceeds a threshold, the averager is to not use the second CFO estimate to determine the CFO average value; and a compensation circuit coupled to the estimation circuit, wherein the compensation circuit is to compensate for CFO between the system and the second system device pair combination using the CFO average value.

17. The system of claim 16, further comprising:

a memory to store a plurality of CFO estimates of the CFO between the system and the second system;

an accumulator coupled to the memory, wherein the accumulator is to calculate a sum of the plurality of CFO estimates; and a divider coupled to the accumulator, wherein the divider is to generate the CFO average value based on the sum and an averaging factor.

18. The system of claim 16, further comprising a circuit to introduce, based at least in part on the CFO average value, a CFO compensation value into a second packet to be transmitted to the second system.

19. The system of claim 16, wherein based at least in part on a cyclic redundancy checksum failure regarding the packet, the averager is to not use the CFO estimate to determine the CFO average value.

* * * * *